United States Patent [19]

Liu

[11] Patent Number: 5,880,767

[45] Date of Patent: Mar. 9, 1999

[54] PERCEPTUAL IMAGE RESOLUTION ENHANCEMENT SYSTEM

[75] Inventor: Samson J. Liu, Menlo Park, Calif.

[73] Assignee: Hewlett-Packard Company, Palo Alto, Calif.

[21] Appl. No.: 712,534

[22] Filed: Sep. 11, 1996

[51] Int. Cl.[6] .................................................. G06K 9/40
[52] U.S. Cl. .......................... 347/251; 382/266; 382/262
[58] Field of Search .................................... 347/240, 251, 347/252, 184; 358/447, 448, 454, 463, 465, 466; 382/266, 262

[56] References Cited

U.S. PATENT DOCUMENTS

| | | | |
|---|---|---|---|
| 4,538,179 | 8/1985 | Tsutomu et al. | 358/166 |
| 4,794,531 | 12/1988 | Morishita et al. | 364/413.13 |
| 5,081,692 | 1/1992 | Kwon et al. | 382/54 |

*Primary Examiner*—N. Le
*Assistant Examiner*—Hai C. Pham
*Attorney, Agent, or Firm*—Denise A. Lee

[57] ABSTRACT

The present invention provides an effective, low cost method and system for enhancing various types of images including photograph, CD, video, and graphic art images. The method of enhancing the input image, includes the steps of: filtering the input image to extract m different frequency components $r_k$; adaptively sharpening the m different frequency components $r_k$, where the amount of sharpening for each component $r_k$ corresponds to a sharpening function $g_k[r_k]$; and adding the adaptively sharpened m different frequency components $g_k[r_k]$ to the input image. Because the sharpening function is typically nonlinear, the step of determining the value of the adaptive frequency component corresponding to the sharpening function is achieved by mapping the filtered component by the corresponding sharpening function.

21 Claims, 7 Drawing Sheets

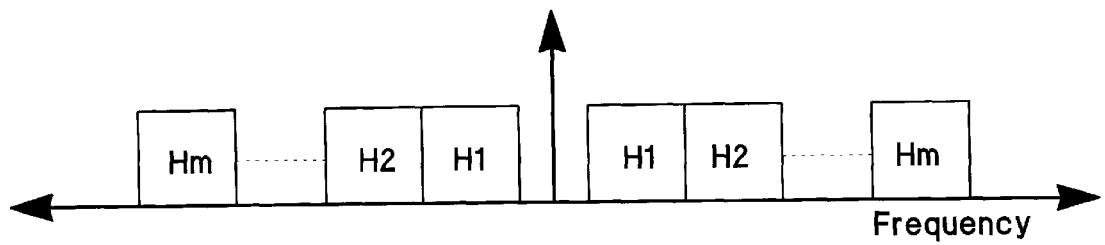
*Figure 2A*
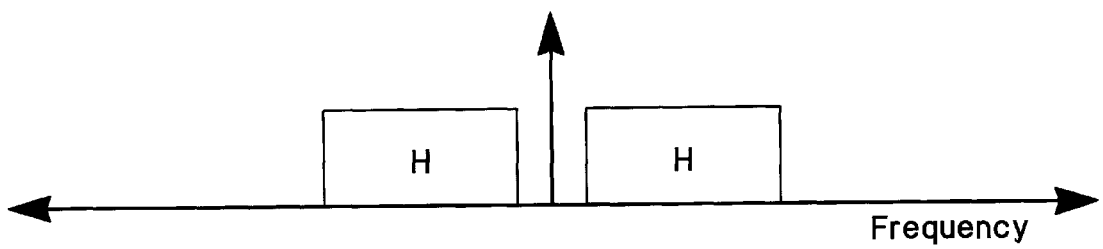
*Figure 2B*
| P1 | P4 | P6 |
|----|----|----|
| P2 | X  | P7 |
| P3 | P5 | P8 |
*Figure 3*

PERCEPTUAL IMAGE RESOLUTION ENHANCEMENT SYSTEM

BACKGROUND OF THE INVENTION

Image resolution has important applications in printers, scanners, or simply any devices related to the visual display of images. Image resolution enhancement is commonly used where the original image source has a low resolution, such as a video image source. A second common usage of image resolution enhancement is where there is blurring of images by linear interpolation. Linear interpolation is often used where an image is enlarged from a smaller image.

To improve the perceived image resolution, the high frequency component of the image typically needs to be augmented. A popular method for improving image resolution used in some hardcopy devices to sharpen images is "unsharp masking." Unsharp masking is a linear filtering process that can be mathematically expressed as y=x+α(h*x) where x is the input signal, y is the output signal, h is the highpass filter, and α is the sharpening gain. Implementation of the unsharp masking process according to the above-identified expression extracts the high frequency component of the input signal by highpass filtering and then weights the extracted component by multiplying it by the gain, α. The weighted component α(h*x) is then added to the input signal to increase the high frequency content.

Although unsharp masking is generally effective in improving the image resolution, it has the disadvantage of causing edge overshoots. A further disadvantage of unsharp masking process is that it does not differentiate between image characteristics such as edges and textures. Thus, it is difficult to attain significant image enhancement using unsharp masking without producing either overly sharpened edges and/or texture.

A computationally efficient, image enhancement system which improves image sharpness without producing either overly sharpened edges and/or texture is needed.

SUMMARY OF THE INVENTION

The present invention provides an effective, low cost method and system for sharpening various types of images including photograph, CD, video, and graphic art images. The method of sharpening the input image, includes the steps of: filtering the input image to extract m different frequency components $r_k$, where k is an index between 1 and m; adaptively sharpening the m different frequency components $r_k$, where the amount of sharpening for each component $r_k$ corresponds to a sharpening function $g_k[r_k]$; and adding the adaptively sharpened m different frequency components $g_k[r_k]$ to the input image. Because the sharpening function is typically nonlinear, the step of determining the value of the adaptive frequency component corresponding to the sharpening function is typically achieved by mapping the filtered component by the corresponding sharpening function.

Unsharp masking multiplies the high frequency component of the original image by a constant α, such that the output image y may be expressed mathematically as y=x+α(h*x)=αr. Although good results can be achieved using unsharp masking, the present invention realizes image perception can be improved by distinguishing between image characteristics such as edges, texture, and noise and adaptively enhancing the desired features based on a function $g_k[r_k]$. The image resolution enhancement system according to the present invention is a based on an "additive subband" model where the augmentation of the extracted high frequency component to improve the perceived image is based on the nonlinear function $g_k[r_k]$. Unlike unsharp masking where the output image can be represented by x+αr, the additive subband model according to the present invention has an additional functional dependence, such that $$y = x + \sum_{k=1}^{m} g_k[r_k]$$

where $g_k[r_k]=\alpha_k f_k[r_k]$. Adaptively sharpening the desired features, according to the present invention, means only the relevant components (like edges) are sharpened and the remaining components are either mildly sharpened or left untouched.

Adaptation according to the function $g_k[r_k]$ is dependent on the kth frequency component and the image characteristics (i.e., either edge or texture). Classification for adaptive sharpening is important in achieving a perceptually pleasing image. For example, if the texture component of the image is over sharpened, the resulting image will look noisy and is typically judged to be perceptually more objectionable than the original image. In addition, it is important not to produce too many too many strong edges by over sharpening of the edge component of the image or else the image will look somewhat artificial. Further, it is important during the adaptive augmentation of the image not to produce visible overshoots around the edges if the image is to be interpolated or else overshoot artifacts may appear.

A further understanding of the nature and advantages of the present invention may be realized with reference to the remaining portions of the specification and the attached drawings.

BRIEF DESCRIPTION OF THE DRAWINGS

FIG. 2A shows the extracted frequency components for an m-component case according to the present invention.

FIG. 2B shows the extracted frequency components for the one component case according to the present invention.

FIG. 3 is a filter mask for a linear filter according to one embodiment of the present invention.

FIG. 9C shows a representative pixel of the output image after image sharpening and edge overshoot reduction of the sharpened image has occurred, and before after the step of linear interpolation.

DETAILED DESCRIPTION OF THE PREFERRED EMBODIMENTS

The present invention provides an effective, low cost method and system for enhancing various types of images including photograph, CD, video, and graphic art images. The image resolution enhancement system and method according to the present invention uses only information available in the image itself so that the information content of the original input image and the enhanced output images remains identical. Thus, the improved image resolution is purely perceptual in that the enhanced image "appears" to be sharper to the human visual system.

Figure 1:
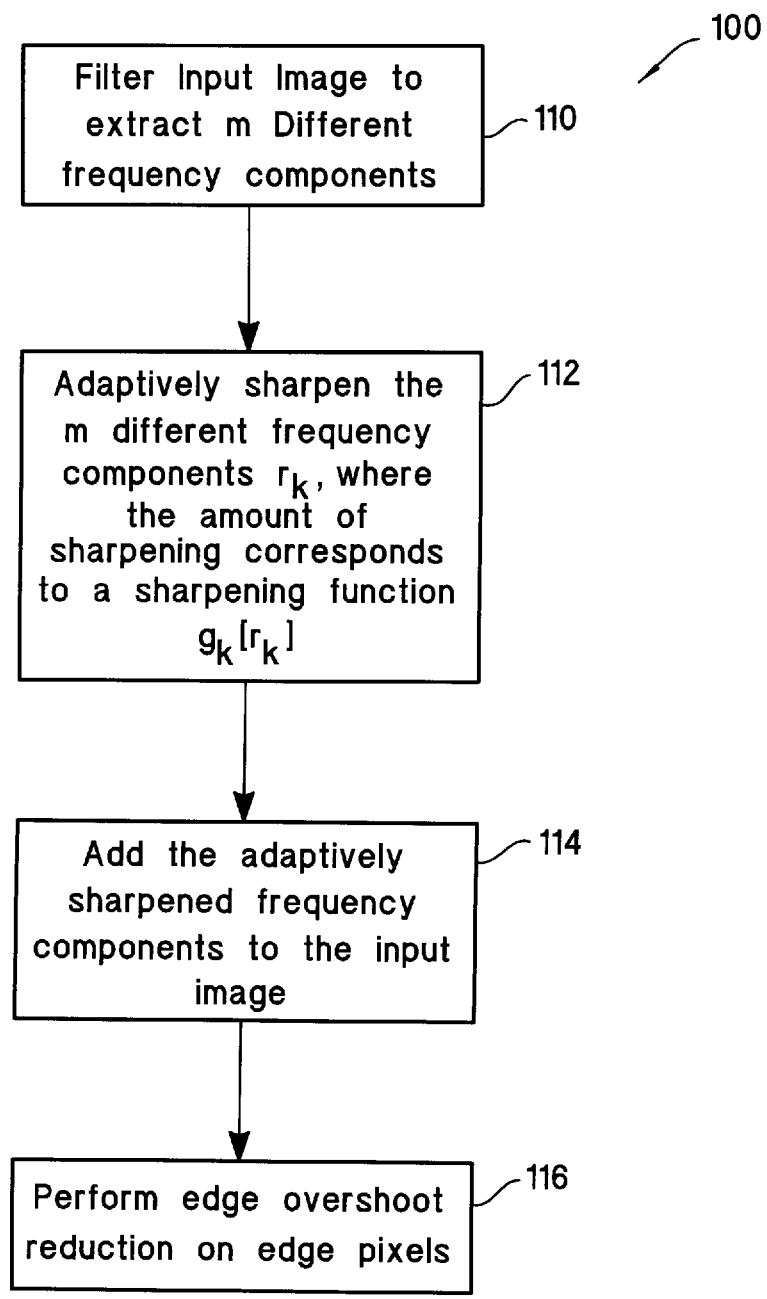
FIG. 1 is a flowchart of the method of sharpening an input image according to the present invention.

FIG. 1 is a flowchart of the method of enhancing an input image according to the present invention. The method 100 of enhancing the input image, includes the steps of: filtering the input image to extract m different frequency components $r_k$ 110, where k is an index having a value between 1 and m; adaptively sharpening the m different frequency components $r_k$, where the amount of sharpening for each component $r_k$ corresponds to a sharpening function $g_k[r_k]$ 112; and adding the adaptively sharpened m different frequency components $g_k[r_k]$ to the input image 114. The above-identified steps are performed for each pixel in the color plane x[m][n] where m is representative of a row in the image array and n is representative of a column n in the image array. Each color plane can be processed independently.

The key to achieving good image resolution is designing for the designated application and image (1) the filters ($h_k$) for extracting the highpass residual, (2) the sharpening function ($g_k$) suited and (3) visible edge overshoot reduction scheme. The first step of the method for enhancing the input image is the step of filtering the input image to extract m different frequency components $r_k$ 110, where k is an index between 1 and m. The filtered component of the input image x may be represented mathematically by $r_k$, where $r_k = h_k * x$ and x is the input image and $h_k$ is the highpass filter.

Many different types of filters may be used to implement the step of filtering the input image to extract the m different frequency components. Preferably, the filtered component is the high frequency component of the image. Although a high pass filter may be used, generally the high pass filtering is performed by first lowpass filtering the image, followed by the step of subtracting the low pass filtered image from the original image to produce the highpass residual, r. For the case where m=1, the one frequency band case, this process can be represented mathematically by the expression:

$$r[m][n] = x[m][n] - \text{lowpass of } x[m][n]. \quad (1)$$

Although other types of filters may be used, two types of filters used experimentally in the implementation of the present invention to extract the low frequency component of the image are (1) linear filters and (2) nonlinear order statistics filters. Both linear filters and nonlinear order statistics filters attempt to estimate the "average" or the low variational of the subimage within the filtering window. From empirical data, both the linear filter and the order statistics filter perform similarly in slow varying and texture regions. However, for edges, the outcomes of the linear filter and the order statistics filter are different. The linear filtering scheme tends to introduce more edge overshoots which may be perceived as artifact when interpolated.

Order statistics filters are typically more robust than linear filters in the presence of image outliers because of the inherent nature of order statistics filter to reject "salt-and-pepper" noise. However, order statistics filters are typically more computationally expensive due to the added operations required to order the pixels. Although, typically linear filters are preferred, depending on the application and the image characteristics, the filter can be predetermined to provide the best result.

In the preferred embodiment, the filter for extracting the low frequency component of the image, is a separable 5 coefficient linear filter. Although the first step in the image enhancement method according to the present invention is filtering the input image to extract m different frequency components $r_k$ 110, where k is an index whose value is between 1 and m. The case where m=1, is the simplest case computationally. The following examples of filters and the steps of image sharpening, unless otherwise noted, are given for the case m=1. Compared to unsharp masking, improved results have been achieved using the present invention using the case m=1. Applicant believes using values of m higher than 1 may result in further improvements in the resulting output image, however, at the expense of increased computational complexity.

The input image is filtered to extract m different frequency components. FIG. 2A shows the extracted frequency components for an m-component case according to the present invention. FIG. 2B shows the extracted frequency components for an m-component case, where m=1 according to the present invention. Although increasing the value of m typically achieves improved image enhancement, good empirical results have been achieved using the m=1 subband case which is believed to be the preferred case.

The separable 5 coefficient filter demonstrated good performance on typical images (in each dimension) with the following values: $h_1 = (2,3,6,3,2)/16$. This filter is equivalent to having a filtering window of 5×5 with each coefficient value equal to $h_1[m]h_1[n]$. Since we are treating this 2-D filter as separable, the rows can be filtered first followed by the column filtering.

An alternative linear filter which has also achieved good results may be mathematically represented by the following expression:

$$r[m][n] = x[m][n] - \sum_{k=1}^{8} P_k \quad (2)$$

where $P_k$ are the pixels around location x as shown in FIG. 3. This highpass filter simply averages the neighboring pixels. The average of the neighboring pixels is then subtracted from the current (center) pixel to produce the residual r[m][n].

A faster implementation of equation 2 can be achieved by noting that $$\sum_{k=1}^{8} P_k = S_1 + S_2 + S_3 - x[m][n]$$

where $s_k$ is the kth column in the 3×3 filtering mask shown in FIG. 3. Thus, $s_1 = x[m-1][n-1] + x[m][n-1] + x[m+1][n-1]$, $s_2 = x[m-1][n] + x[m][n] + x[m+1][n]$ and $s_3 = x[m-1][n+1] + x$

[m][n+1]+x[m+1][n+1]. It is important to note that $s_1$ and $s_2$ have already been found from computing the previous highpass residual, r[m][n−1] so we only need to find $s_3$ for the current r[m][n]. Thus to compute r[m][n], we can now use the following expression, $$r[m][n]=x[m][n]-((s_1+s_2+s_3-x[m][n])>>3), \quad (3)$$

where ">>" is the bit shift operator. Thus to implement the fast implementation represented by equation 3, we need a total of 6 adds and 1 shift operation for each pixel.

In an alternative embodiment, a nonlinear order statistics filter is used. Order statistics filtering requires a pre-ordering of the pixel values in the filtering window either in ascending or descending order. The lowpass estimation of x can be simply the median value of the weighted sum centered at the median position. As an example, let x(0), x(1), . . . , x(8) be the nine pixel values in ascending order, i.e., x(0), x(4), x(8) are the smallest, the median and the largest values, respectively. Thus the lowpass estimate of x[m][n] can be just x(4) or $\beta_0$x(4)+summation $\beta_k$(x((4−k)+x(4+k))). For the later case, a set of filtering coefficients that was tested to provide good results is $(\beta_0,\beta_1,\beta_2,\beta_3,\beta_4)$=(0.5, 0.25, 0,0,0). Lastly, note that the number of operations required for pixel ordering can be reduced by utilizing the overlapping of the pixels in the sliding window (as in the fast implementation of linear filter 2).

After the m different frequency components are extracted from the original image by filtering, the next step in the image enhancement process is adaptively sharpening the m different frequency components $r_k$, where the amount of sharpening for each component $r_k$ corresponds to a sharpening function $g_k[r_k]$ 112. Because the sharpening function is typically nonlinear, the step of determining the value of the adaptive frequency component corresponding to the sharpening function is achieved by mapping the filtered component by the corresponding sharpening function.

Unsharp masking multiplies the high frequency component of the original image by a constant $\alpha$, such that the output image y may be expressed mathematically as y=x+$\alpha$(h*x). Although good results can be achieved using unsharp masking, the present invention realizes image perception can be improved by distinguishing between image characteristics such as edges, texture, and noise and adaptively enhancing the desired features based on a function g[r]. The image resolution enhancement system according to the present invention is a based on an "additive subband" model where the augmentation of the extracted high frequency component to improve the perceived image is based on the nonlinear function g[r]. Unlike unsharp masking where the output image can be represented by x+$\alpha$r, the additive subband model according to the present invention has an additional functional dependence, such that y=x+g[r], where g[r]=$\alpha$f[r]. Adaptively sharpening the desired features, according to the present invention, means only the relevant components (like edges) are sharpened and the remaining components are either mildly sharpened or left untouched.

Adaptation according to the function g[r] is dependent on the frequency k and the image characteristics (i.e., either edge or texture). Classification for adaptive sharpening is important in achieving a perceptually pleasing image. For example, if the texture component of the image is over enhanced, the resulting image will look noisy and is typically judged to be perceptually more objectionable than the original image. In addition, it is important not to produce too many strong edges by over enhancement of the edge component of the image or else the image will look somewhat artificial.

Figure 4:
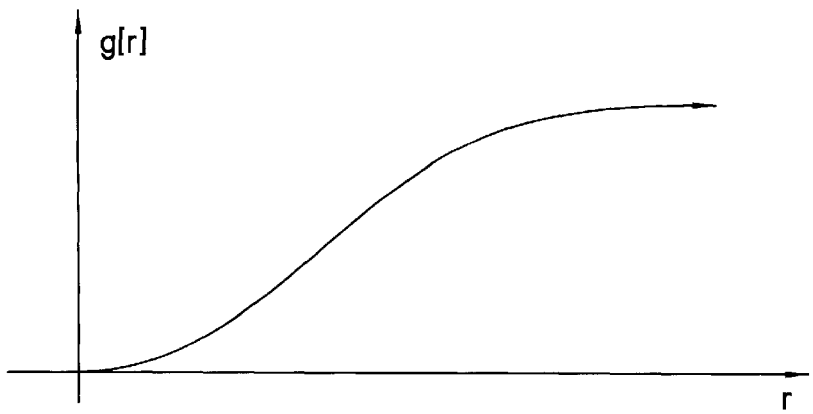
FIG. 4 shows a graphical representation of a nonlinear sharpening function $g_k[r_k]$.

The magnitude can be used for classification. Typically, the stronger the edge, the larger the corresponding |r|. Thus a good sharpening function g[r] should increase monotonically with respect to |r|. FIG. 4 shows a graphical representation of a nonlinear sharpening function g[r]. Preferably the function g[r] is relatively small for a small r (texture component) and large for a larger r (edge component) as is reflected in FIG. 4.

For the one component case, a practical g[r] can be the following form, $$g[r] = \alpha f[r] \text{ where } f[r] = \begin{cases} |r|(a + b|r|) \text{ for } r = \{0,\pm1,\pm2,\ldots,\pm L\}, \\ L(a + bL) \text{ otherwise,} \end{cases}$$

where a, b, and L are free parameters that control the relative amount of edge and texture sharpening. Although the above-identified sharpening equation performs well, other sharpening equations g[r] may be used.

Empirically, we found that a good set of values to use for 24 bit color images is {a,b,L}={0.1,0.075,20}, and {a,b,L}= {0.1,0.085,15} for 8 bit pallidized images. These sets of parameters will weight r proportional to its magnitude so that f[r] increases with respect to |r|. Note that the maximum value of is limited to L(a+bL) to prevent over sharpening. Also note that the computational cost of finding can be reduced by using a look-up table approach where is generated only once and stored in a data array. Simply by setting $\alpha$=0, the input image will be unaltered, y=x. Setting $\alpha$=0 can be used to disable the sharpening stage without affecting the overall pipeline. For efficient computation of $\alpha$f[r], a table look-up approach can be used, where $\alpha$f[r] is generated only once and stored in a data array.

After the step of determining the value of the adaptive frequency component, the adaptive frequency components are added to the input image to augment the high frequency component of the input image. Typically, the adaptive frequency component is multiplied by the constant $\alpha$. Thus, after the step of multiplying the adaptive frequency components by the constant $\alpha$, and adding the adaptive frequency components to the input image, the output image y[m][n] may be mathematically represented by:

$$y[m][n]=x[m][n]+\alpha f[r[m][n]].$$

Figure 5A:
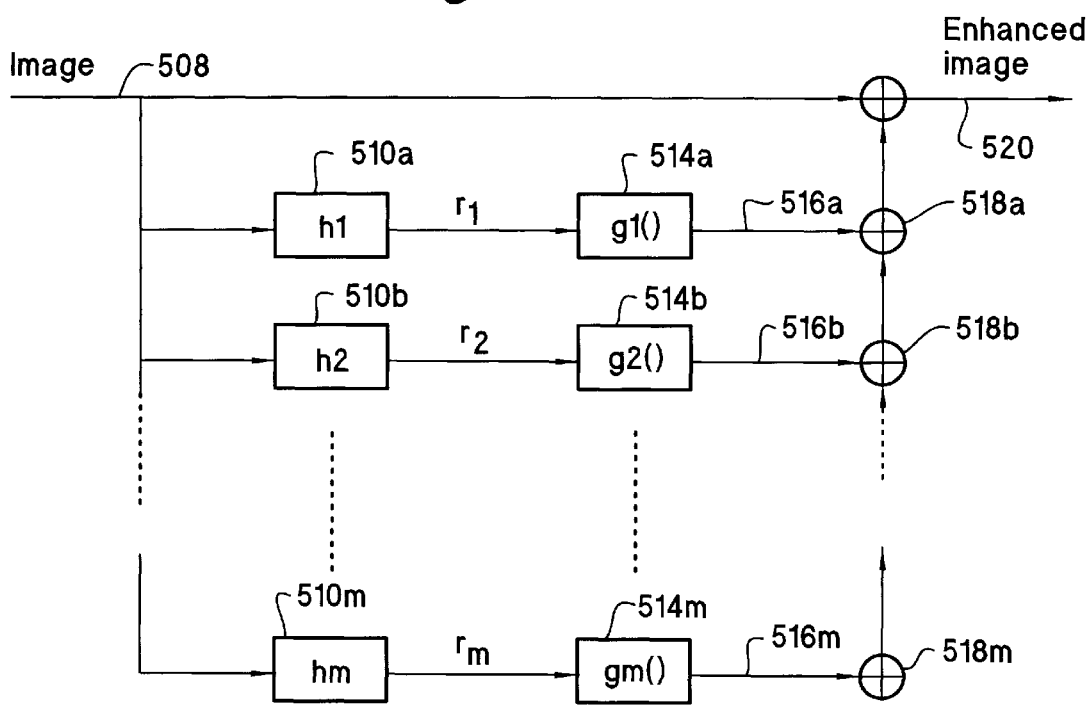
FIG. 5A shows a block diagram representation of the image sharpening system for the m component case.
Figure 5B:
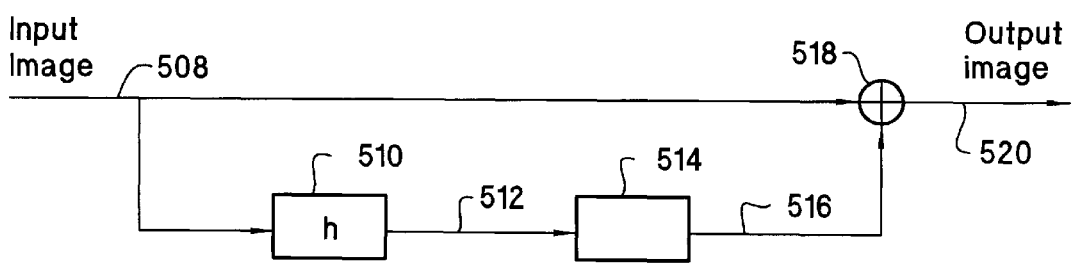
FIG. 5B shows a block diagram representation of the image sharpening system for the one component case.

For a general m component system, the image sharpening scheme can be expressed by can be expressed by $$y = x + \sum_{K=1}^{m} g_k[h_k*x]$$

where $h_k$ is the bandpass filter and $g_k$ is the sharpening function. FIG. 5A shows a block diagram representation of the image resolution enhancement system for the m component case. FIG. 5B shows a block diagram representation of the image resolution enhancement system for the one component case.

The image resolution enhancement system includes a filtering means 510 for extracting m different frequency components $r_k$ from an input image; a means for adaptively sharpening the m different frequency components $r_k$ 514 where the amount of sharpening for each component $r_k$ corresponds to a sharpening function $g_k[r_k]$; and a means for adding 518 the adaptively sharpened m different frequency components $g_k[r_k]$ to the input image, the result of the addition being an output image. Referring to FIG. 5A, each of the m different frequency components $r_k$ is filtered from the input image 508 by the filtering means 510a–510m. The result of the filtering is $r_k$. The m components $r_k$ are then adaptively sharpening the m different frequency components $r_k$, where the amount of sharpening for each component $r_k$ corresponds to a sharpening function $g_k[r_k]$ by the means for adaptively sharpening 514. The result of the adaptive sharpening $g_k[r_k]$ 516 is then added to the input image by the means for adding 518 resulting in an output image 520.

The simplest case is when m=1, the one component system, $$y=x+g[h*x]=x+g[r]$$

where h is the highpass filter, g is the sharpening function and x is the original input image.

Figure 6:
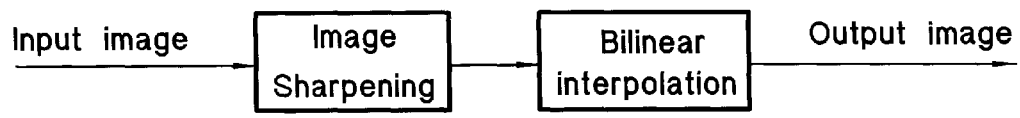
FIG. 6 shows an image sharpening/interpolation system according to an alternative embodiment of the present invention.

Image scaling or interpolation is usually required before printing. For example, if an image is scanned at below 300 dpi (dots per inch) but is to be printed on a 300 dpi printer, the image needs to be scaled up to retain its original size. FIG. 6 shows an image sharpening/interpolation system according to an alternative embodiment of the present invention. Referring to FIG. 6, after the input image 602 is sharpened by the image shapener 604, the sharpened image 606 is filtered using a bilinear interpolator 608.

Although it is common to perform interpolation based on linear filtering such as the bilinear interpolator, linear interpolation typically blurs the image since the interpolated image bandwidth is reduced proportionally to the scale-up factor.

Figure 7A:
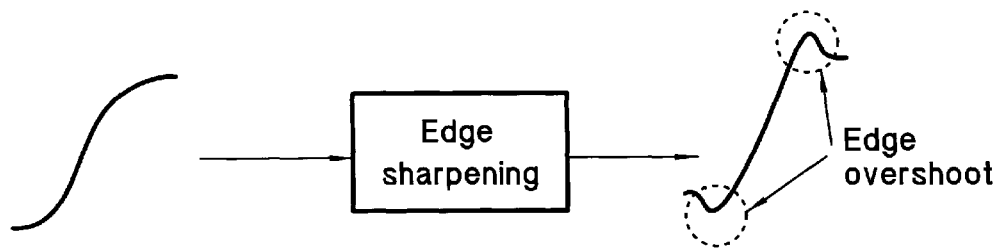
FIG. 7A shows a representative pixel of the image before and after image sharpening has occurred, but before interpolation of the sharpened image.
Figure 7B:
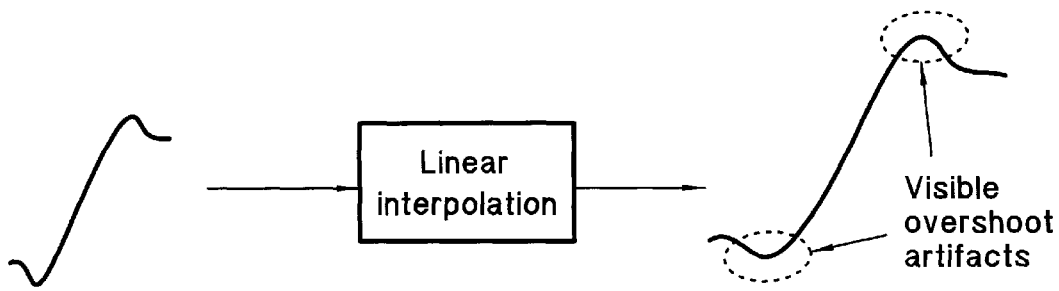
FIG. 7B shows a representative pixel of the image after image sharpening has occurred and both before and after interpolation of the sharpened image has occurred.

Image sharpening with linear interpolation is a smoothing process, using image sharpening before scaling can enhance the perceived image quality. However, sharpening based on highpass filtering will generally introduce overshoot at each side of a strong edge. FIG. 7A shows a representative pixel of the output image after image sharpening has occurred, but before interpolation of the sharpened image. If the image is not interpolated (see FIG. 7A), the overshoot is typically not visible to the human eye, and in many cases it is actually desirable since it adds more contrast to the edge. For large interpolation factors, however, the overshoots are enlarged and they appear as artifacts as illustrated in FIG. 7B.

The linear filtering scheme tends to introduce more edge overshoots which may be perceived as artifact when interpolated. Visible overshoot artifacts are typically only observed for strong edges. For textured regions, no annoying artifacts were observed even at large scaling factors. To reduce the overshoot artifacts, while maintaining the sharpened edge transition, the sharpening scheme according to the present invention is modified.

Figure 8:
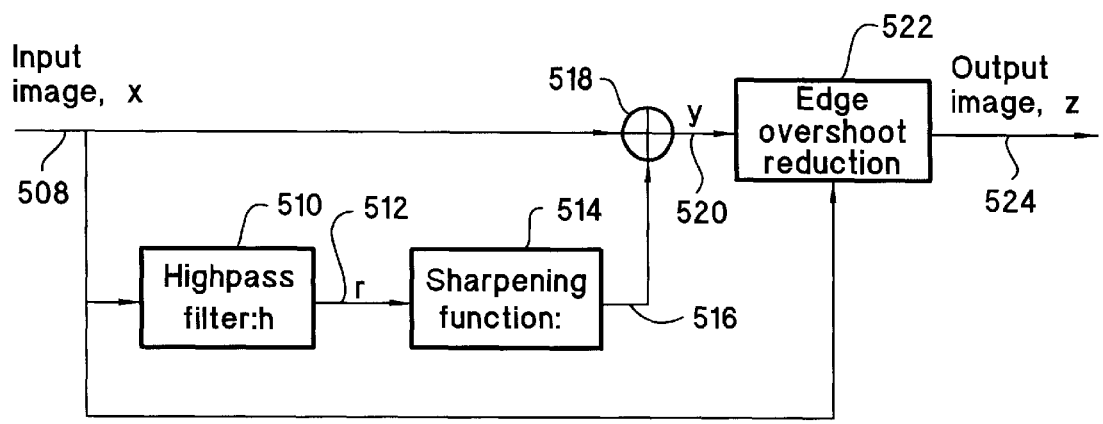
FIG. 8 shows an image sharpening system which includes a means for reducing edge overshoot.
Figure 9A:
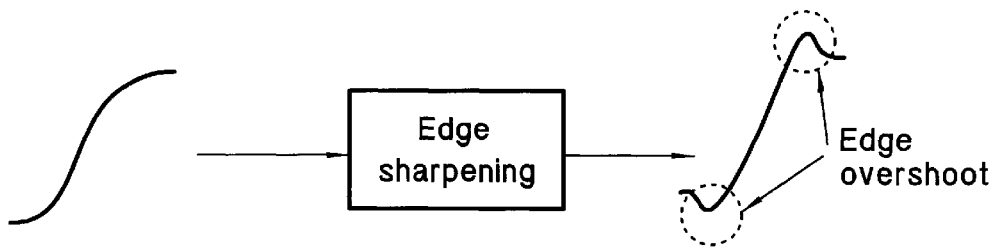
FIG. 9A shows a representative pixel of the image before and after image sharpening has occurred according to an alternative embodiment of the present invention.

FIG. 8 shows an image sharpening system which includes a means for reducing edge overshoot. FIG. 9A shows a representative pixel of the image before and after image sharpening has occurred according to an alternative embodiment of the present invention. After edge sharpening has occurred there is visible edge overshoot. Although, the step of performing edge overshoot reduction is not required in the embodiment where the image is adaptively sharpened the step of reducing edge overshoot 216 is preferred. The step of performing edge overshoot reduction occurs after the step of adding the adaptive frequency component to the input image.

Figure 9B:
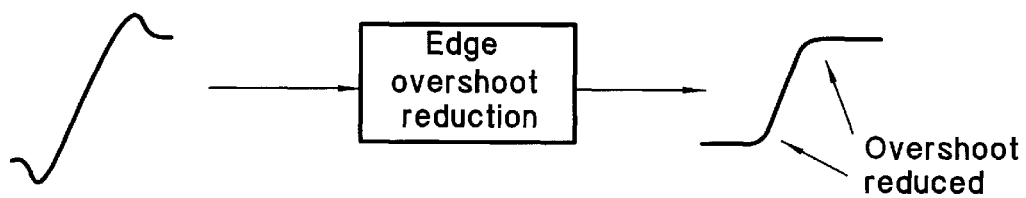
FIG. 9B shows a representative pixel of the output image after image sharpening and both before and after edge overshoot reduction of the sharpened image has occurred.
Figure 9B:
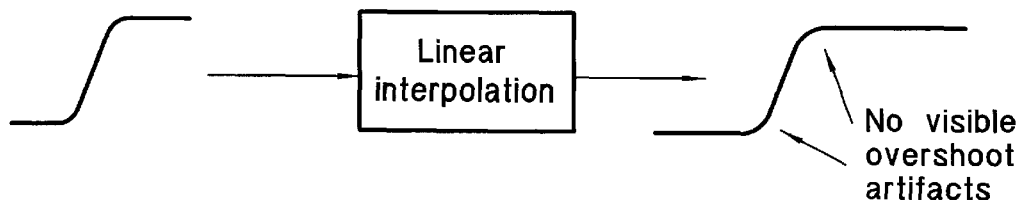

FIG. 9B shows a representative pixel of the output image after image sharpening and both before and after edge overshoot reduction of the sharpened image has has occurred. Typically, we limit the occurrence of the overshoot by clipping the sharpened "edge" pixel, y[m][n], between a minimum and a maximum value of the subimage window containing x[m][n]. This procedure is only performed for edge pixels where the overshoot is likely to occur. Edge overshoot typically occurs in cases the edges are sharpened. The effects of edge overshoot are especially perceptible when there is image scaling with large interpolation factors, or for certain types of images such as paletized.

Figure 10:
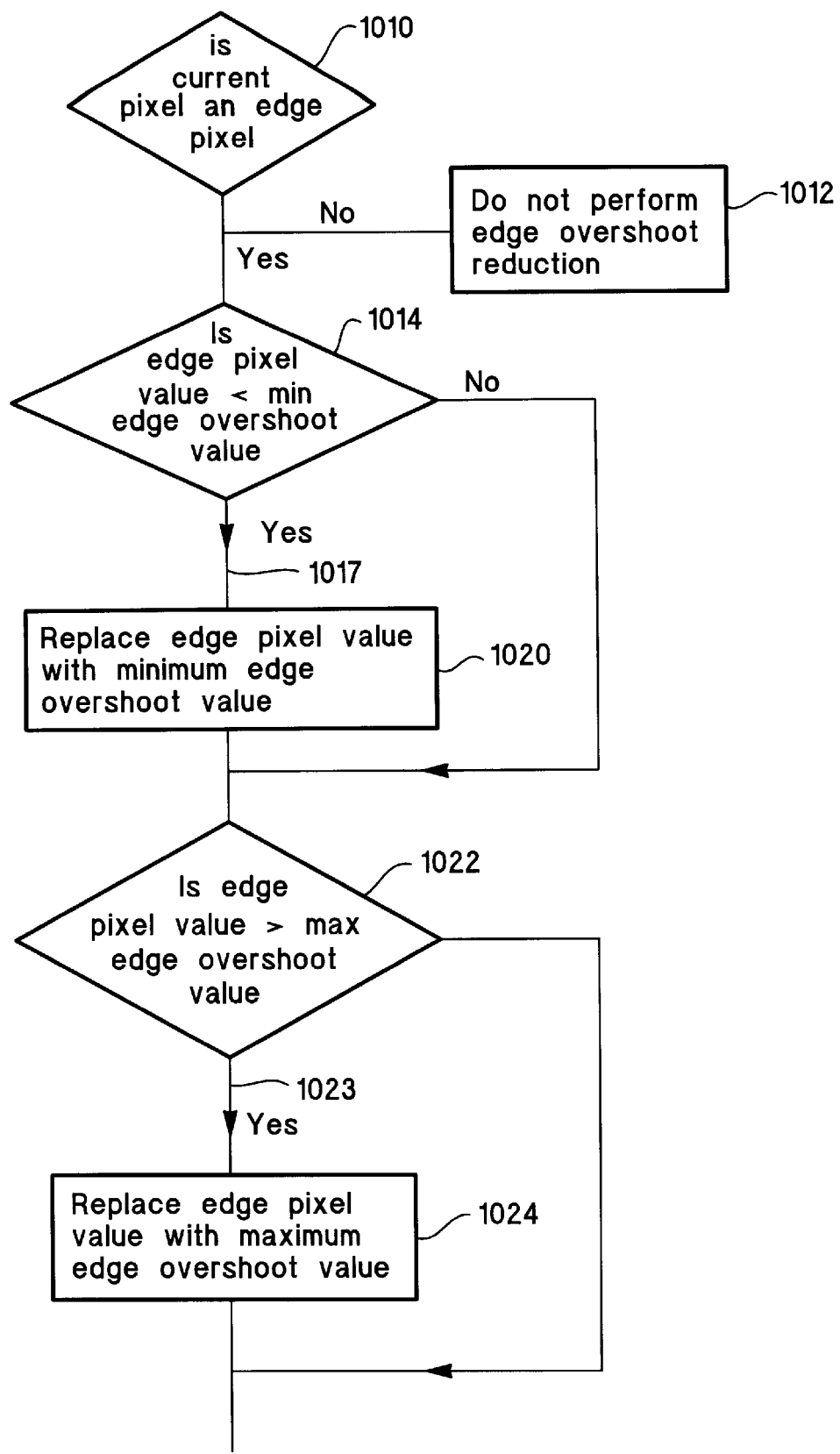
FIG. 10 shows a method of performing edge overshoot reduction according to one embodiment of the present invention.

The following is a description of the overshoot reduction scheme. FIG. 10 shows a method of performing edge overshoot reduction on edge pixels according to one embodiment of the present invention. The method of performing edge overshoot reduction on the edge pixels includes the steps of: determining whether the current pixel is an edge pixel 1010; comparing the edge pixel to a minimum edge overshoot value 1014; replacing the edge pixel value with the minimum edge overshoot value when the edge pixel value is less than the minimum edge overshoot value 1020; comparing the edge pixel to a maximum edge overshoot value 1022; and replacing the edge pixel value with the maximum edge overshoot value when the edge pixel value is greater than the minimum edge overshoot value 1024.

The first step in performing edge overshoot reduction is to determine whether the current pixel is an edge pixel 1010. Typically for the n×m window shown in FIG. 3, determining whether the current pixel is an edge pixel includes the step of finding the minimum and maximum values of the current pixel, denoted as min and max respectively. Next, use the max and min values to determine whether the current pixel is an edge pixel by performing the following thresholding test. If (max−min)>edge$_T$ then the current pixel x[m][n] is an edge pixel, otherwise it is a "smooth" pixel. Empirically, we have found a good threshold value to use for edge$_T$=40. Again, this parameter can be adjusted to best suit a specific application or image type.

If the current pixel is not an edge pixel, then edge overshoot reduction is not performed 1012. If the current pixel x[m][n] is an edge pixel, the output y[m][n] is restricted to lie between min and max. The current pixel is compared to the minimum edge overshoot value 1014. If the current pixel is less than <min 1017, then y[m][n] is replaced by min, y[m][n]=min 1020. Next, the current pixel is compared to the maximum edge overshoot value 1022. Similarly, if the current pixel >max 1023, then y[m][n]=max 1024. Otherwise, y[m][n] is unaltered. This max/min clipping method is quite effective in preventing overshoot from occurring, as is shown in FIG. 9B.

Figure 11:
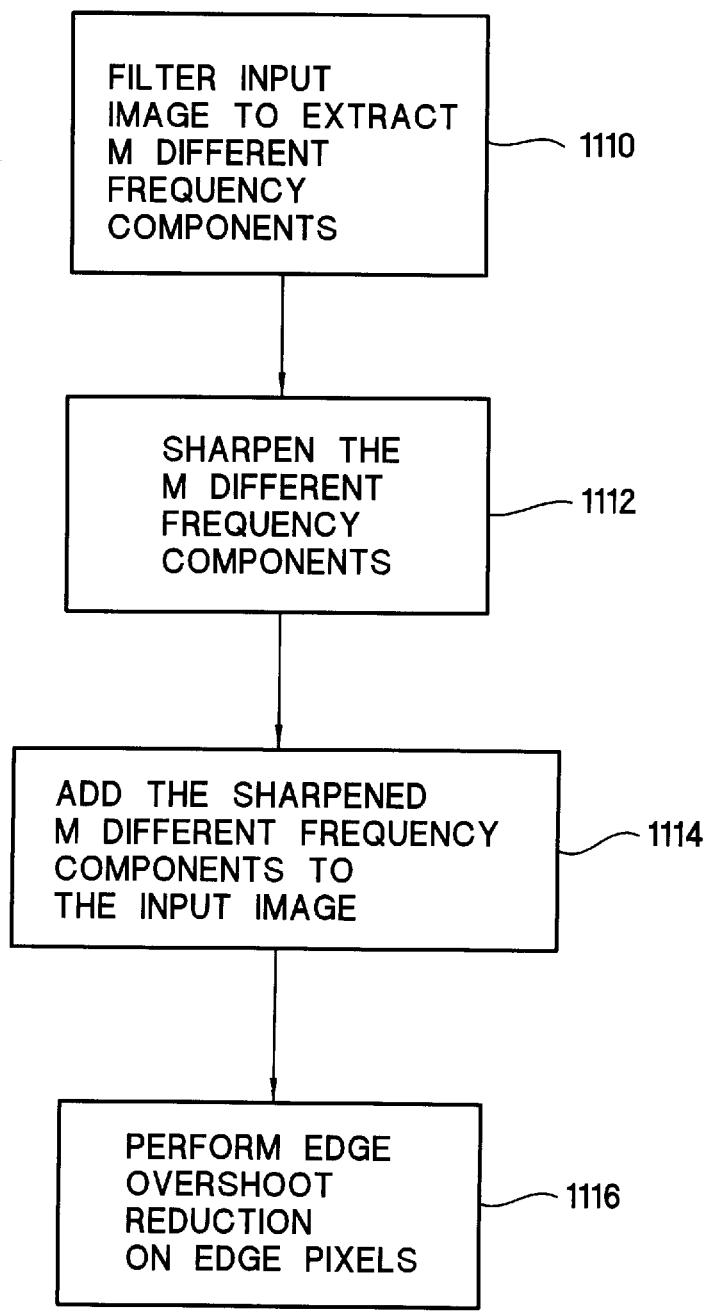
FIG. 11 is a flowchart of the method of enhancing an input image according to an alternative embodiment of the present invention.

Although the step of performing edge overshoot reduction may be performed in combination with the step of adaptively sharpening the m different frequency components $r_k$, in an alternative embodiment of the present invention, the step of performing edge overshoot reduction may be performed in conjunction with a variety of sharpening techniques. For example, the step of performing overshoot reduction may be performed in combination with the unsharp masking sharpening technique. FIG. 11 shows a flowchart of a method of sharpening an input image according to an alternative embodiment of the present invention. Referring to FIG. 11, the method of sharpening an input image include the steps of: filtering the input image to extract m different frequency components $r_k$ 1110; sharpening the m different frequency components $r_k$ 1112; adding the sharpened m different frequency components to the input image 1114; and performing edge overshoot reduction 1116. The method of FIG. 11 can be implemented in an image resolution enhancement system shown in FIG. 8 which includes: a filtering means 510 for extracting m different frequency components $r_k$ from an input image; a means for sharpening 514 the m different frequency components $r_k$; a means for adding 518 the sharpened m different frequency components to the input image; and a means for performing edge overshoot reduction 522 on the result of the addition of the sharpened m different frequency components and the input image 520.

It is understood that the above description is intended to be illustrative and not restrictive. The scope of the invention should therefore not be determined with reference to the appended claims, along with the full scope of equivalents to which such claims are entitled.

What is claimed is:

1. A method of sharpening an input image, the method including the steps of:

filtering the input image to extract m different frequency components $r_k$;

adaptively sharpening the m different frequency components $r_k$ according to an adaptive sharpening function $g_k[r_k]$, where an amount of sharpening for each component $r_k$ corresponds to a magnitude of the frequency component $r_k$ where m is a positive integer number; and adding the adaptively sharpened m different frequency components $g_k[r_k]$ to the input image.

2. The method according to claim 1 wherein the sharpening function $g_k[r_k]$ for adaptively sharpening the m different frequency components $r_k$ is nonlinear.

3. The method according to claim 1 wherein the sharpening function $g_k[r_k]$ for adaptively sharpening the m different frequency components $r_k$ is equal to $\alpha f_k[r_k]$ where $\alpha_k$ is a gain and $f_k[r_k]$ is the sharpening function.

4. The method according to claim 1 wherein the step of adding the adaptively sharpened m different frequency components $g_k[r_k]$ to the input image is an output image y, the output image y being mathematically expressed by $$y = x + \sum_{K=1}^{m} g_k[h_k * x]$$

where x is the original image, $h_k$ is the bandpass filter, and $g_k[r_k]$ is the sharpening function.

5. The method according to claim 1 wherein the step of adaptively sharpening the m different frequency components $r_k$, where the amount of sharpening for each component $r_k$ corresponds to the sharpening function $g_k[r_k]$ is achieved by mapping the filtered component by the corresponding sharpening function.

6. The method according to claim 1 wherein for the case where m=1 the step of filtering the input image to extract m different frequency components $r_k$ further includes the steps of: filtering the m different frequency components $r_k$ using a low pass filter and subtracting the result filtered image from the original image.

7. The method recited in claim 6 wherein the low pass filter is a linear filter.

8. The method recited in claim 6 wherein the low pass filter is an order statistics nonlinear filter.

9. The method recited in claim 3 wherein for the case where m=1 the function $f_k[r_k]$ can be mathematically represented by $$f[r] = \begin{cases} |r|(a + b|r|) \text{ for } r = \{0, \pm 1, \pm 2, \ldots, \pm L\}, \\ L(a + bL) \text{ otherwise}, \end{cases}$$

where a, b, and L are free parameters that control a relative amount of edge and texture sharpening.

10. The method recited in claim 1 further including the step of performing edge overshoot reduction on the edge pixels of the image.

11. The method recited in claim 10 wherein the step of performing edge overshoot reduction includes the steps of:

determining whether a current pixel is an edge pixel;

comparing the edge pixel to a minimum edge overshoot value;

replacing the edge pixel value with the minimum edge overshoot value when the edge pixel value is less than the minimum edge overshoot value;

comparing the edge pixel to a maximum edge overshoot value; and replacing the edge pixel value with the maximum edge overshoot value when the edge pixel value is greater than the minimum edge overshoot value.

12. A method of sharpening an input image comprised of a plurality of pixels, the method including the steps of:

filtering the input image to extract m different frequency components $r_k$ where m is a positive integer number $r_k$;

sharpening the m different frequency components $r_k$;

adding the sharpened m different frequency components to the input image; and performing edge overshoot reduction on a result of the addition of the sharpened m different frequency components and the input image.

13. The method recited in claim 12 wherein the step of performing edge overshoot reduction includes the steps of:

determining whether a current pixel is an edge pixel;

comparing the edge pixel to a minimum edge overshoot value;

replacing the edge pixel value with the minimum edge overshoot value when the edge pixel value is less than the minimum edge overshoot value;

comparing the edge pixel to a maximum edge overshoot value; and replacing the edge pixel value with the maximum edge overshoot value when the edge pixel value is greater than the minimum edge overshoot value.

14. An image resolution enhancement system, the image resolution enhancement system including:

a filtering means for extracting m different frequency components $r_k$ from an input image where m is a positive integer number;

a means for adaptively sharpening the m different frequency components $r_k$ according to an adaptive sharpening function $g_k[r_k]$, where an amount of sharpening for each component $r_k$ corresponds to a magnitude of the frequency component $r_k$; and a means for adding the adaptively sharpened m different frequency components $g_k[r_k]$ to the input image.

15. The image resolution enhancement system according to claim 14 wherein the values of the sharpening function are stored in a look-up table.

16. An image resolution enhancement system, the image resolution enhancement system including:

a filtering means for extracting m different frequency components $r_k$ from an input image wherein m is a positive integer number;

a means for sharpening the m different frequency components $r_k$ where an amount of sharpening for each component $r_k$ corresponds to a magnitude of the frequency component $r_k$;

a means for adding the sharpened m different frequency components to the input image; and a means for performing edge overshoot reduction on a result of the addition of the sharpened m different frequency components and the input image.

17. A method of sharpening an input image, the method including the steps of:

filtering the input image to extract m different frequency components $r_k$;

adaptively sharpening the m different frequency components $r_k$ accoding to an adaptive sharpening function $g_k[r_k]$, where an amount of sharpening for each component $r_k$ corresponds to a magnitude of the frequency component $r_k$ adding the adaptively sharpened m different frequency components $g_k[r_k]$ to the input image, wherein the step of adding the adaptively sharpened m different frequency components $g_k[r_k]$ to the input image is an output image y, the output image y being mathematically expressed by $$y = x + \sum_{K=1}^{m} g_k[h_k * x]$$

where x is the original image, $h_k$ is a bandpass filter, and $g_k[r_k]$ is the sharpening function, wherein m is greater than or equal to 2.

18. A method of sharpening an input image, the method including the steps of:

filtering the input image to extract m different frequency components $r_k$;

adaptively sharpening the m different frequency components $r_k$ according to an adaptive sharpening function $g_k[r_k]$, where an amount of sharpening for each component $r_k$ corresponds to a magnitude of the frequency component $r_k$, and where m is greater than or equal to two; and adding the adaptively sharpened m different frequency components $g_k[r_k]$ to the input image.

19. The method according to claim 18 wherein the sharpening function $g_k[r_k]$ for adaptively sharpening the m different frequency components $r_k$ is nonlinear.

20. The method according to claim 18 wherein the sharpening function $g_k[r_k]$ for adaptively sharpening the m different frequency components $r_k$ is equal to $\alpha f_k[r_k]$ where $\alpha_k$ is a gain.

21. A method of sharpening an input image, the method including the steps of:

filtering the input image to extract m different frequency components $r_k$;

adaptively sharpening every filtered coefficient in each of the m different frequency components $r_k$ according to an adaptive sharpening function $g_k[r_k]$, where an amount of sharpening for each component $r_k$ corresponds to a magnitude of the frequency component $r_k$; and adding the adaptively sharpened m different frequency components $g_k[r_k]$ to the input image.

* * * * *

UNITED STATES PATENT AND TRADEMARK OFFICE
CERTIFICATE OF CORRECTION

PATENT NO. : 5,880,767
DATED : March 9, 1999
INVENTOR(S) : Samson J. Liu

It is certified that error appears in the above-identified patent and that said Letters Patent is hereby corrected as shown below:

Column 11,
Line 6, delete "accoding" and insert therefor -- according --

Signed and Sealed this

Thirteenth Day of July, 2004

JON W. DUDAS
*Acting Director of the United States Patent and Trademark Office*